United States Patent [19]

Tharp

[11] Patent Number: 5,032,325
[45] Date of Patent: Jul. 16, 1991

[54] PLASTIC COARSE BUBBLE DIFFUSER FOR WASTE WATER AERATION SYSTEMS

[75] Inventor: Charles E. Tharp, Columbia, Mo.

[73] Assignee: Environmental Dynamics, Inc., Columbia, Mo.

[21] Appl. No.: 430,785

[22] Filed: Nov. 2, 1989

[51] Int. Cl.$^5$ .............................. B01F 3/04
[52] U.S. Cl. ................................. 261/124
[58] Field of Search ........................ 261/124

[56] References Cited

U.S. PATENT DOCUMENTS

| | | | |
|---|---|---|---|
| 2,730,468 | 1/1956 | Martin | 261/124 |
| 2,730,496 | 1/1956 | Zavod | 261/124 |
| 2,771,320 | 11/1956 | Korwin | 261/124 |
| 3,080,124 | 3/1963 | Rathmann | 261/124 |
| 3,608,834 | 9/1971 | MacLaren | 261/124 |
| 3,785,629 | 1/1974 | McKinney | 261/124 |
| 3,953,553 | 4/1976 | Thayer | 285/286 |
| 3,953,554 | 4/1976 | Loughridge | 261/124 |
| 4,474,714 | 10/1984 | Downs | 261/124 |

Primary Examiner—Tim Miles
Attorney, Agent, or Firm—Kokjer, Kircher, Bradley, Wharton, Bowman & Johnson

[57] ABSTRACT

A generally tubular coarse bubble diffuser for aerating waste water is constructed of polyvinyl chloride or a similar plastic material. The diffuser body has a main section with flat side walls through which outlet ports are formed. The opposite ends of the diffuser body are cylindrical and are connected with the main section by transition sections which avoid abrupt changes in the wall thickness or diffuser connector diameter. One end is solvent welded in a plastic Tee fitting and the other end receives a removable end cap. The flat walls provide efficient oxygen transfer and the cylindrical ends allow the use of a threaded end cap and a secure large diameter solvent weld connection to the Tee fitting which directs air to the diffuser.

20 Claims, 1 Drawing Sheet

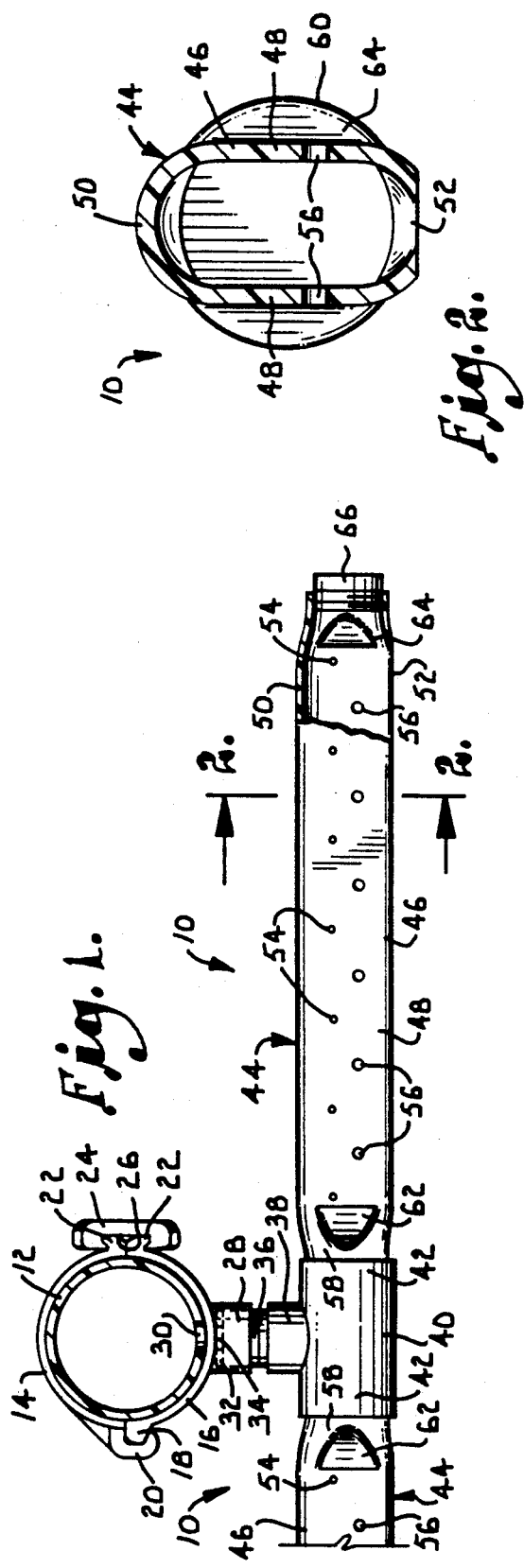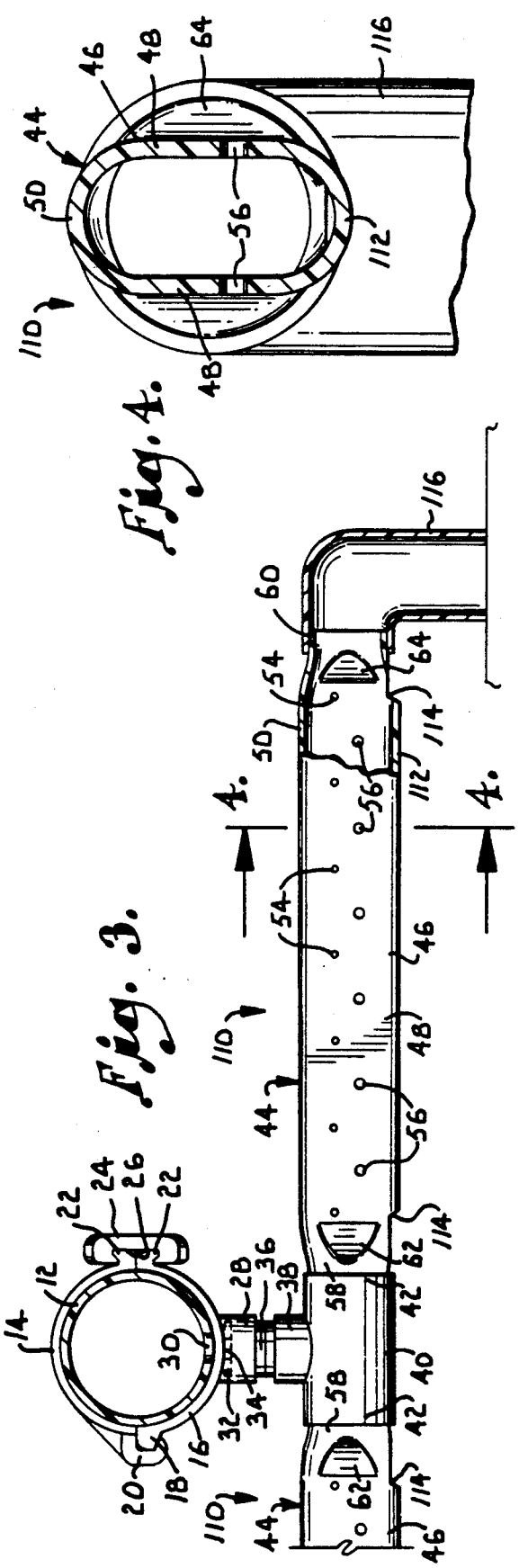

PLASTIC COARSE BUBBLE DIFFUSER FOR WASTE WATER AERATION SYSTEMS

BACKGROUND AND SUMMARY OF THE INVENTION

This invention relates in general to the aeration of waste water and more particularly to a plastic diffuser which discharges air into waste water in the form of relatively large bubbles.

The treatment of waste water involves, among other things, aerating the waste water in order to transfer oxygen to it. In the past, the aeration function has been performed by a variety of different types of diffusers, including fine bubble diffusers, flexible membrane diffusers, porous tube diffusers, dome diffusers, and coarse bubble diffusers. Although coarse bubble diffusers are not particularly efficient in transferring oxygen to the water because of the relatively large size of the bubbles, they are advantageous in other respects, most notably in that they have low maintenance requirements. Thus, coarse bubble diffusers are used primarily in systems where low maintenance is especially important.

As disclosed in U.S. Pat. No. 3,953,553, it is beneficial to employ what may be referred to as a wide band diffuser geometry in which diffusers are installed perpendicular to the lateral pipe. Maximum diffuser floor coverage and maximum wide band diffuser activity are provided. In this type of arrangement, long diffusers with maximum bubble release area are desirable. Coarse bubble diffusers that mount on top of the pipe are possible but are less economical and less efficient than the wide band approach.

The connection of coarse bubble diffusers to the air lateral piping has presented significant problems. Threaded connections suffer from structural weakness that can cause premature failure, especially when relatively long diffusers are used and the diffuser length increases the loading on the connection due to the increased leverage effect that results from increased diffuser length. In addition, the rotative position of the diffuser can vary when a threaded connection is used, and the diffuser can thus be oriented improperly and have no adjustment. Moreover, threaded connections involve abrupt changes in diameter from the fitting diameter to the diffuser diameter, causing a stress concentration that has required castings rather than weldments to be used.

Stainless steel is typically employed as the material of which generally tubular wide band coarse bubble diffusers are constructed. Stainless steel diffusers require metal fittings which are typically stainless steel for corrosion resistance. There is no ability to add or subtract diffusers in the field, there is a need for factory fabrication of the pipe and shipment specifically to the job site, and salts and chemicals in the waste water can degrade the metal.

The present invention is directed to a plastic coarse bubble diffuser that is improved in a number of respects in comparison to the tubular wide band coarse bubble diffusers that have been used in the past. It is a particular object of the invention to provide a coarse bubble diffuser that is constructed to be mounted to the aeration system piping in a secure manner without special pipe fabrication techniques or fittings. In this regard, a mounting arrangement of the type disclosed in pending application Ser. No. 340,265, filed Apr. 19, 1989 may be used, and the diffuser may be glued to the mounting tee to provide a full 3" diameter connection that is strong enough to withstand the considerable forces that are applied to the diffuser in service. Additionally, the diffuser is secured in the proper position, is adjustable and cannot inadvertently rotate or otherwise become improperly oriented. The diffuser and mounting bracket can be installed on any type of pipe having iron pipe diameter, including polyvinyl chloride, stainless steel, steel, ABS and the like. Attachment does not require special outlets or fittings but instead requires only that a hole be drilled to accept the mounting saddle. These features are achieved by providing a cylindrical inlet end on the diffuser body for connection with the tee outlet of the mounting arrangement, or with another fitting having a circular outlet to which the diffuser inlet can be solvent welded. The construction of the diffuser from polyvinyl chloride or a similar plastic material permits solvent welding of the connection permanently in the proper orientation, as compared with prior screw in diffusers that are often installed too tightly or too loosely to create operational problems.

Another object of the invention is to provide a coarse bubble diffuser in which maximum liquid velocity across the outlet openings is achieved. This feature is accomplished by providing the diffuser body with flat side walls. The air which exits from the outlet openings in the side walls is subjected to maximum shear because of the high liquid velocity that results from the flat shape of the side walls. Consequently, the air bubbles are maintained as small as possible for the size of the outlet openings, and the oxygen transfer efficiency is enhanced accordingly.

A further object of the invention is to provide a coarse bubble diffuser of the character described in which the air dispersion along the length of the diffuser is uniform.

Still another object of the invention is to provide a coarse bubble diffuser of the character described in which the diffuser body has an end ca that can be conveniently removed to allow inspection and/or cleaning of the diffuser interior. The downstream end of the diffuser body has a cylindrical shape so that the end cap can simply be threaded into and out of the diffuser or another type of removable end plug can be conveniently employed.

An additional object of the invention is to provide a coarse bubble diffuser of the character described having a diffuser body that is strong enough to withstand the forces to which it is subjected while in service. Despite the two transitions that are required between the flat wall center section of the diffuser body and the cylindrical opposite ends, the construction and configuration of the diffuser provides transition areas that avoid abrupt changes in the wall thickness diameter of connections or the creation of any weak points near the inlet end where stresses are concentrated. A full three inch connection is used rather than ¾ nipples or other weak connections.

Yet another object of the invention is to provide a coarse bubble diffuser of the character described which is suitable for use as an open bottom unit or a unit which is equipped with a deflector at the bottom to deflect large solids such as rags and the like.

Still another object of the invention is to provide a coarse bubble diffuser of the character described which is simple and economical to construct, which can be easily installed in the field without the need for special tools, and which has low maintenance requirements.

Other and further objects of the invention, together with the features of novelty appurtenant thereto, will appear in the course of the following description.

DESCRIPTION OF THE DRAWINGS

In the accompanying drawings which form a part of the specification and are to be read in conjunction therewith and in which like reference numerals are used to indicate like parts in the various views:

FIG. 1 is an elevational view of a portion of a waste water aeration system that is equipped with a pair of coarse bubble diffusers constructed according to a preferred embodiment of the present invention, with one of the diffusers shown only fragmentarily and a portion of the other diffuser broken away for illustrative purposes;

FIG. 2 is a sectional view on an enlarged scale taken generally along line 2—2 of FIG. 1 in the direction of the arrows;

FIG. 3 is an elevational view similar to FIG. 1, but showing a modified diffuser which is equipped with a deflector on the bottom and a mud leg which is shown in section; and FIG. 4 is a fragmentary sectional view on an enlarged scale taken generally along line 4—4 of FIG. 3 in the direction of the arrows.

DETAILED DESCRIPTION OF THE INVENTION

Referring now to the drawings in more detail and initially to FIGS. 1 and 2, numeral 10 generally designates a coarse bubble diffuser which discharges air into waste water for purpose of aerating the waste water. The diffuser 10 is useful in a waste water treatment system of the type disclosed more specifically in my pending application, Ser. No. 340,265, filed on Apr. 19, 1989 and entitled DIFFUSER MOUNTING ARRANGEMENT FOR WASTE WATER AERATION SYSTEMS, which application is hereby incorporated by reference.

The waste water treatment system includes a generally horizontal air lateral 12 which receives the air and which may be a cylindrical plastic pipe constructed of polyvinyl chloride (PVC), SS, polyethylene, steel or another suitable material. One or more of the diffusers 10 may be connected with the air lateral 12 by a mounting arrangement of the type disclosed more specifically in the above referenced pending application, Ser. No. 340,265. The mounting device includes a saddle type bracket which has a pair of mating saddle sections 14 and 16 that fit closely around the air lateral 12. A lip 18 on saddle section 16 fits closely within a C shaped flange 20 which is formed on the other saddle section 14. The fit of the flange 20 on the lip 18 provides a hinge about which the two saddle sections may be closed around the air lateral 12. Opposite the hinge, the saddle sections 14 and 16 are provided with hooks 22, and the hooks 22 are secured tightly together by a special wedge-type fastener 24 having a gradually tapering channel 26 which receives the hooks 22. Because of the taper in the passage 26, the fastener 24 can be slid lengthwise along the hooks 22 in order to progressively tighten the hooks against one another to secure the mounting saddle securely on the air lateral.

The saddle type mounting bracket includes an outlet spout 28 which extends outwardly from the lower saddle section 16. The spout 28 is aligned with an opening 30 which is drilled through the wall of the air lateral 12. Additionally, the outlet spout 28 may be provided with a flat, circular plate 32 having a central orifice 34 through its center. (The opening 30 can function as an orifice if desired or an adjustable orifice can be provided, as by using interchangeable orifice plates 32 with different sized orifices.) The presence of the orifice 34 results in a pressure drop on the downstream or bottom side of the orifice.

The spout 28 is internally threaded. A threaded nipple 36 has exterior threads that mate with the internal threads of the spout 28 so that the nipple can be threaded into the spout. The nipple 36 may be glued rather than threaded to the spout 28, and glued connection is actually preferable in many applications. The bottom end of the nipple 36 is received and solvent welded to the inlet 38 of a Tee fitting 40. The Tee fitting includes opposed outlets 42, and one of the diffusers 10 is connected with each of the outlets 42. Although the Tee fitting can be virtually any size, the inlet 38 is preferably 2" in diameter, while the outlets 42 are preferably 3" in diameter. The Tee fitting 40 is constructed of polyvinyl chloride or a similar plastic material.

In accordance with the present invention, the coarse bubble diffuser 10 has a generally tubular diffuser body 44 constructed of polyvinyl chloride or a similar plastic material. The diffuser body 44 has a main section 46 which occupies the majority of the diffuser body length. As best shown in FIG. 2, the main section 46 has parallel side walls 48 and a curved top wall 50. The side walls 48 are substantially flat. The main section 46 has an open bottom 52. The top wall 50 connects the two side walls 48 and is integral with them.

Each side wall 48 of the main section 46 is provided with an upper row of outlet openings 54 and a lower row of outlet openings 56. The upper openings 54 operate at low air flow rates, while the openings 56 in the lower row are considerably larger than the openings 54 in the upper row in order to allow efficient operation over a wide range of air flow. At air flow rates of approximately 8 cfm, only the upper openings discharge air. Maximum capacity of the diffuser before flowing out is about 50 cfm. Both rows of openings act in the range between 8 and 50 cfm.

The diffuser body has cylindrical opposite ends 58 and 60 which are connected with the main section 46 by transition sections 62 and 64, respectively. The upstream end 58 of each diffuser is closely fitted in one of the Tee fitting outlets 42 and is permanently solvent welded to the Tee fitting in the proper orientation. The opposite cylindrical end 60 is the downstream end of the diffuser body and may be internally threaded so that it can receive a removable end cap 66. The end cap 66 is externally threaded and has a circular configuration so that it can be threaded into the downstream end 60 of the diffuser body and removed when desired simply by threading it out of the end 60. Alternatively, another type of removable end cap can be used, including a plug that can be inserted into the end 60 and mechanically expanded to secure it in place.

The transition sections 62 and 64 are substantially identical and serve to provide gradual transitions between the flat side walls 48 of the main section 46 and the cylindrical end sections 58 and 60. Preferably, the diffuser body 44 is molded in a single integral piece. The cylindrical ends 58 and 60 are preferably standard pipe sizes, and the end cap 66 may thus be a standard plastic end cap or special threaded end cap (or other type of end closure) that will mate with end 60 of the diffuser body.

In practice of the invention, the diffusers may be spaced along the pipe at individual locations with each diffuser mounted on an elbow connected with the mounting saddle. Alternatively, a pair of the coarse bubble diffusers 10 may be arranged in a duplex configuration, with one of the diffusers 10 mounted to each of the outlets 42 of the Tee fitting 40. This assures that the two diffusers 10 in the duplex arrangement will be in axial alignment so that when the threaded nipple 36 is threaded or glued into spout 28, both diffusers 10 will be in a level condition and will be axially aligned. It is noted that the mounting saddle can be rotated on the air lateral 12 to level the diffusers as necessary. The compressed air that is supplied to the air lateral 12 exits therefrom through the drilled opening 30, and may pass through a separate orifice 34, spout 28, nipple 36 and the Tee fitting 40 into the two diffuser bodies 44. The air is discharged from the diffuser bodies through the outlet openings 54 and 56 in the form of relatively large bubbles, thus aerating the waste water in which the diffusers 10 are immersed.

The cylindrical configuration of each end 58 and 60 is important. The cylindrical upstream end 58 can be fitted in and solvent welded to the Tee fitting outlet 42, thus providing a secure solvent welded connection for the diffuser and permitting the high strength mounting saddle arrangement to be used for mounting of the diffusers. It is again pointed out that the circular geometry allows the full diameter of the end 58 (normally three inch diameter) and Tee fitting outlet 42 to be used in connecting the diffuser. At the same time, there is no need for any abrupt transitions to a smaller diameter threaded section (typically ¾ inch) which has been used in the past with stainless steel diffusers and other types of diffusers. Because of the large diameter cylindrical shape of the end sections 58 and 60, the transition sections 62 and 64 can be gradual transitions which avoid the presence of abrupt changes in material thickness or stress points near the inlet end of the diffuser which can create likely areas of failure. Using full diameter connections provides maximum strength with full 3 inch diameter connection versus typical ¾ inch threaded fittings in prior diffuser designs. In addition, factory installation of the diffusers permanently into the tee by solid welding assures proper orientation. Threaded connections may be over or under tightened trying to get proper orientation; therefore, these connections can be damaged or damage the piping system.

At the downstream end 60, the use of cylindrical geometry permits a standard end cap or special threaded cap 66 (or other end closure) to be used to cap the end of the diffuser. The cap 66 can be easily removed to permit inspection and/or cleaning of the diffuser body interior and the full 3" diameter of the Tee fitting 40. With the end caps 66 of both diffusers in the duplex diffuser arrangement removed, full access is provided to the entire length of the diffuser assembly to allow solids or debris to be flushed or rodded out of the duplex diffuser installation. A rod or flushing hose can be extended simultaneously through the full length of both diffusers to remove solids and other debris from both diffusers and the Tee fitting 40.

It is important in order to achieve efficient oxygen transfer for the side walls 38 of the main section to be flat walls. By providing flat walls in the area of the diffuser body through which the outlet openings 54 and 56 are formed, the velocity of liquid across the exterior surface of the walls is maximized, and maximum shear forces are thus exerted on the air which exits through the outlet ports 54 and 56. These shear forces minimize the size of the bubbles that discharge from the diffuser, and this in turn increases the oxygen transfer efficiency.

Thus, the present invention provides a tubular coarse bubble diffuser which is relatively efficient in its oxygen transfer characteristics because of the flat walls of the main section 46. At the same time, the cylindrical ends of the diffuser body provide structural strength, good operational characteristics and maintenance benefits that are not achieved with other tubular coarse bubble diffusers. All of these features are achieved in a plastic diffuser which can be securely mounted by means of its plastic construction and which avoids the disadvantages of stainless steel or other wide band diffuser.

FIGS. 3 and 4 depict a duplex diffuser installation in which the diffusers 110 are for the most part identical to the diffusers 10, and in which the diffusers are mounted in the manner previously indicated. The principal difference in the diffuser arrangement shown in FIG. 3 is that each diffuser body 44 is provided with a curved bottom wall 112 of the main diffuser section 46, purge openings 114 are provided in the bottom of each transition section 62 and 64, and an elbow 116 is used in place of the end cap 66 and serves as a mud leg. The elbow 116 is fitted around and solvent welded to the downstream end 60 of the diffuser body, and the lower end of the elbow rests on or near the bottom of the basin which contains the waste water undergoing treatment.

In the diffuser arrangement of FIGS. 3 and 4, the bottom wall 112 serves as a deflector to prevent rags and other solid materials from entering the diffuser body through the bottom. The openings 114 serve as purge openings which permit water to be purged from the interior of the diffuser body.

It should be noted that the diffuser 10 can be used in arrangements other than the duplex arrangement shown in the drawings, particularly as a simplex unit. Additionally, the diffuser can be mounted other than by means of the mounting arrangement shown in the drawings. For example, the diffuser may be solvent welded to a Tee fitting or other type of fitting which is directly connected with the air lateral 12 or another pipe.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. In a waste water aeration system having a plastic fitting presenting at least one cylindrical air outlet, an improved diffuser arrangement comprising:

an elongated bubble diffuser having a molded plastic diffuser body formed integrally as a single molded piece and terminating in cylindrical opposite ends, one of said ends fitting closely in said outlet of the fitting and being solvent welded thereto to connect the diffuser in a generally horizontal orientation in cantilever extension;

a main section of said diffuser body located between said ends and occupying the majority of the length of the diffuser body, said main section having substantially flat opposite side walls oriented generally parallel to one another and a top wall connecting said side walls;

a plurality of outlet openings in each of said side walls for discharging the air in said diffuser body into the waste water;

a pair of smoothly and gradually tapered transition sections of said diffuser body smoothly connecting said main section with the respective ends thereof and providing transitions between the cylindrical ends and the flat side walls of the main section, said transition sections being integral with said opposite ends and said main section of the diffuser body and being devoid of abrupt cross-sectional size changes in said transitions; and a removable end cap for closing the end of the diffuser body opposite said one end thereof.

2. The diffuser arrangement of claim 1, wherein said main section of the diffuser body is open at the bottom.

3. A coarse bubble diffuser for aerating waste water, said diffuser comprising:

a plastic diffuser body having cylindrical upstream and downstream ends, said upstream end being cylindrical for connection with a plastic fitting supplying air to the diffuser body;

a main section of said diffuser body located between said ends and occupying the majority of the length of the diffuser body, said main section having substantially flat opposite side walls oriented generally parallel to one another and a top wall connecting said side walls;

a plurality of outlet openings in each of said side walls for discharging the air in said diffuser body into the waste water;

a transition section of said diffuser body connecting said upstream end with said main section and providing a transition between the cylindrical upstream end and the flat side walls of the main section, said transition section being integral with said upstream end and said main section;

a second transition section which provides a transition between the cylindrical downstream end and the flat side walls of the main section; and a plastic elbow solvent welded to said downstream end and providing a mud leg for the diffuser body.

4. The diffuser of claim 1, where in said main section has an open bottom.

5. The diffuser of claim 1, including a bottom wall on said main section connecting the side walls thereof, said transition section being open at the bottom to provide a purge opening for purging water or solids from the diffuser body.

6. The diffuser of claim 1, wherein:
said downstream end is cylindrical end is connected with said main section by a second transition section which provides a transition between the cylindrical downstream end and the flat side walls of the main section.

7. The diffuser of claim 6, including a bottom wall on said main section connecting the side walls thereof, said first mentioned transition section and said second transition section being open at the bottom to provide purge openings for purging water from the diffuser body.

8. The diffuser of claim 7, including a plastic elbow solvent welded to said downstream end and providing a mud leg for the diffuser body.

9. The diffuser of claim 6, including a removable end cap on said downstream end.

10. The diffuser of claim 9, wherein:
said downstream end and said end cap have mating threads establishing a threaded connection therebetween.

11. The diffuser of claim 9 wherein in said main section has an open bottom.

12. A diffuser assembly for a waste water aeration system having a spout for receiving air, said diffuser assembly comprising:

a plastic Tee fitting having an inlet presenting a pair of opposed cylindrical outlets in axial alignment, said inlet mating with the internally threaded spout to mount the Tee fitting thereon;

a pair of elongated coarse bubble diffusers each having a molded plastic diffuser body presenting cylindrical opposite ends, one end of each diffuser body being solvent welded in one of said Tee fitting outlets to connect the diffusers in cantilever extension from said fitting in horizontal orientations;

a main section of each diffuser body located between said opposite ends thereof and occupying the majority of the length of the diffuser body, each main section having substantially flat opposite side walls oriented generally parallel to one another and a top wall connecting said side walls;

a plurality of outlet openings in each side wall of each diffuser body for discharging air into the waste water in relatively large bubbles;

a pair of smoothly and gradually tapered transition sections of each diffuser body integrally connecting the main section thereof with the respective ends thereof and providing smooth transitions between the cylindrical ends and the flat side walls of the main section, said transitions being devoid of abrupt cross-sectional size changes; and a removable end cap on the end of each diffuser body opposite said one end thereof, said opposite end being open upon removal of the end cap to provide access to the interior of the diffuser body.

13. The diffuser assembly of claim 12, wherein each diffuser body is open at the bottom.

14. The diffuser assembly of claim 12, wherein each diffuser body has a bottom wall connecting the side walls thereof and the transition sections of each diffuser body are open at the bottom to provide purge openings for purging water from the diffuser body.

15. The diffuser assembly of claim 12, wherein said end caps have threaded connections with the opposite ends of the respective diffuser bodies.

16. The diffuser assembly of claim 15, wherein each diffuser body has a bottom wall connecting the side walls thereof and the transition sections of each diffuser body are open at the bottom to provide purge openings for purging water from the diffuser body.

17. The diffuser assembly of claim 12, wherein said diffuser bodies are substantially in axial alignment with one another to permit rodding or flushing out of the diffuser bodies when said end caps are both removed.

18. The diffuser assembly of claim 17, wherein said end caps have threaded connections with the opposite ends of the respective diffuser bodies.

19. The diffuser assembly of claim 18, wherein each diffuser body is open at the bottom.

20. The diffuser assembly of claim 18, wherein each diffuser body has a bottom wall connecting the side walls thereof and the transition sections of each diffuser body are open at the bottom to provide purge openings for purging water from the diffuser body.

* * * * *